United States Patent Office 2,760,432

Patented Aug. 28, 1956

2,760,432

LITHOGRAPHIC PLATE AND METHOD OF MAKING IT

William H. Wood, Mantua, Ohio, assignor to Harris-Seybold Company, Cleveland, Ohio, a corporation of Delaware No Drawing. Application May 6, 1950, Serial No. 160,583

6 Claims. (Cl. 101—149.2)

In lithography a desirable lithographic plate would have non-printing areas which would effectively attract water, and printing areas which would effectively attract ink, and which would maintain those properties through an extended life as long as that particular plate and subject matter was to be printed. This ideal has not been realized to the desired extent with the commercially available plates. Non-printing areas have tended to lose their water-holding ability, and various expedients have been tried to restore this action. And the printing areas have been subject to deterioration, and too soon lose their ink-receptivity and clear-cut character. Electroplated surfaces have been considerably used in lithography, but plating can not be laid down uniformly, and the deposit is thin at the center of the plate and thickest towards the edges.

By the present invention, it now becomes possible to prepare lithographic plates in which the distinction between the water-receptive and ink-receptive areas is sharp and is maintained to surprisingly long working life, instead of the common too-early loss of desirable selective action. Other objects and advantages will appear from the following description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

I have found that metal surfaces generally available to provide lithographic plate water-retaining non-printing areas, whether of integral sheet stock or of electroplated form, have a molecular structure which favors change when subjected to plate preparation operations and printing conditions. Rolled plates have distorted crystal surfaces, and still more importantly, include micro-impurities, and electro-plated surfaces likewise have enough included micro-impurities to make them also reactive and prone to change. On the other hand, a surface formed from condensation of metal vapor presents a molecular structure which in a lithographic plate is uniquely inert and stable. Whether this is because of uniformity of crystal layer or because of absence of micro-impurities or because of something else, is not clear. However, regardless of any theoretical considerations, in preparing a lithographic plate by the present invention a metal surface is first provided on a supporting base by vacuum vaporization and deposit of a metal as a film surface. This thickness need not be more than a few hundred thousandth's of an inch, and for practical purposes may be in the range of .000005" to .0001". As contrasted with customary electro-plated lithograph plates, the present construction can provide a particularly thin metal facing. A layer of even a few molecules can be sufficient. And it is uniform and free from pin-holes and impurity-molecules. In the subsequent operation of etching there thus becomes possible a new standard in saving of time and saving of metal unnecessarily laid down and etched away. The details of vaporization and deposit of the metal may be on the order of the known procedures, and it is sufficient here to note that in general a satisfactory procedure may involve heating the metal in a suitable crucible or container by high frequency induction apparatus, the support surface on which the metal is to be condensed being enclosed with the vaporizing equipment in a suitable chamber which is evacuated to a very low vapor pressure, e. g., on the order of 5–10 microns. Reference may be had for example to "Vacuum Technique" by Saul Dushman (Pub. by John Wiley & Sons, Inc., N. Y. 1949), pages 757–764. Irrespective of the details of the procedure, the metal which is to provide the desired surface is vaporized and in vacuo deposited on a suitable supporting base. A wide range of metals as desired is applicable. For example, aluminum, chromium, zinc, molybdenum, zirconium, and titanium are here particularly desirable. The supporting base may involve quite a range of materials. It may be sheet metal, or sheet plastic, or cellulose in compact sheet form, or combinations of these laminated; and the vacuum-deposited metal thus may be applied directly on the base. A particularly satisfactory lithographic plate for my usages may be made up of a sheet base of a synthetic resin or plastic of hydrophobic ink-receptive inert character, viz. polystrene, cellulose acetate, polymethyl methacrylate, poly esters such as allyl phthalate and analogs and the like, such resins or plastics having an advantage of not only providing a support but at the same time with a surface being characterized by receptivity to lithographic inks and by being inert, i. e. having resistance to attack or solution by the components of such inks. These synethic resins are normally not only able to form a mechanically adequate base, but also function by reason of the physical properties of ink-receptiveness and water-repellency to provide the image areas of the plate. With the other mentioned base materials, whether metal, cellulose, etc., against I may include such additional advantageous element and provide a layer of polystyrene or like synthetic resin on the support. And in any case where the base is of the category presenting a synthetic resin surface, the metal which is provided as vacuum-deposited film, is applied on the synthetic resin or plastic.

With a plate thus having a metal face as a vacuum-deposited metal film, and a sub-jacent layer of polystyrene or the like, as mentioned, the plate is then coated with a light-sensitive coating, which may be of the usual compositions, such as albumin, casein, gum arabic, etc., sensitized in accordance with usual practice, as by ammonium bichromate, etc. And, the light-sensitized plate is exposed with a positive transparency of the subject matter to be reproduced, and is then developed, as in usual practice. Chloride solutions containing some amounts of an organic acid, or with particular advantage the developing solution set forth in Patent No. 2,265,829 may be employed. Next, the surface is etched. A peculiarity of the present form of plate, with its vacuum-deposited metal surface, is that this metal is much more resistant to etching than the usual form of metal. And thus, even such metals as aluminum and zinc require more drastic etching action than these metals in their customary lithographic plate form. Such metal as chromium is particularly resistant to the etching, and for this, as well as for other metals, catalytic etching as set forth in the Patent application of K. Sollner, Serial No. 120,229, issued as Patent No. 2,585,864 dated February 12, 1952, is particularly advantageous. After etching, surplus etch is removed, the plate being washed with water. The plate now presents a surface in which some areas are covered by the light-hardened coating or resist, and the other areas have the polystyrene or the like exposed, the thin metal film having been etched through. The resist is then removed and the metal areas of the plate are de-sensitized, using customary de-sensitizers such as gum arabic with ammonium bichromate, and with or without phosphoric acid.

The preferred full combination is that the finished plate has a surface with image areas of polystyrene or hydrophobic synthetic resin, and non-image areas of the metal which was protected during the etching by the resist coating. These metal surfaces are particularly water-receptive or hydrophilic, and maintain their characteristic in this respect to a greater extent than might be found by usual means. And, the ink-receptive surfaces of synthetic resin are particularly ink-attracting and water-repellent by virtue of their natural ink-receptive character and inertness to chemical action, and thus through the working life of the plate there is a clear-cut selectivity between printing and non-printing areas.

Other modes of applying the principle of the invention may be employed, change being made as regards the details described, provided the features stated in any of the following claims, or the equivalent of such, be employed.

I therefore particularly point out and distinctly claim as my invention:

1. In a process of the character described, preparing a lithographic plate providing ink-attracting portions and water-attracting portions by vaporizing aluminum in vacuo and depositing it on a support base having a polystyrene surface, applying a light-sensitive coating to the deposited metal, exposing to light with the subject matter to be reproduced, developing whereby the surface of the deposited aluminum is bared between the light-hardened portions of said coating, etching through such bared portions of the aluminum to the polystyrene, removing the light-hardened portions of said developed coating, and de-sensitizing the aluminum surfaces thus bared.

2. In a process of the character described, preparing a lithographic plate providing ink-attracting portions and water-attracting portions by vaporizing a metal in vacuo and depositing it on a support base having a polystyrene surface, applying a light-sensitive coating to the deposited metal, exposing to light with the subject matter to be reproduced, developing, whereby the surface of the deposited metal is bared between the light-hardened portions of said coating, etching through such bared portions of the metal to the polystyrene, removing the light-hardened portions of said developed coating, and de-sensitizing the metal surfaces thus bared.

3. In a process of the character described, preparing a lithographic plate providing ink-attracting portions and water-attracting portions by vaporizing a metal in vacuo and depositing it on a supporting base having a hydrophobic ink-receptive inert synthetic resin surface, applying a light-sensitive coating to the deposited metal, exposing to light with the subject matter to be reproduced, developing, whereby the surface of the deposited metal is bared between the light-hardened portions of said coating, etching through such bared portions of the deposited metal to the synthetic resin surface, removing the light-hardened portions of said developed coating, and de-sensitizing the metal surfaces thus bared.

4. A plate for lithographic printing providing ink-attracting and water-attracting surfaces, comprising a support base having a polystyrene surface, said first-named surfaces consisting of bared portions of said polystyrene surface and said second-named surfaces consisting of intervening portions of aluminum vacuum-deposited on said polystyrene surface and rendered hydrophilic by de-sensitizing treatment.

5. A plate for lithographic printing providing ink-attracting and water-attracting surfaces, comprising a support base having a polystyrene surface, said first-named surfaces consisting of bared portions of said polystyrene surface and said second-named surfaces consisting of intervening portions of metal vacuum-deposited on said polystyrene surface and rendered hydrophilic by de-sensitizing treatment.

6. A plate for lithographic printing providing ink-attracting and water-attracting surfaces, comprising a support base having a hydrophobic ink-receptive inert synthetic resin surface, said first-named surfaces consisting of bared portions of said resin surface and said second-named surfaces consisting of intervening portions of metal vacuum-deposited on said synthetic resin surface and rendered hydrophilic by de-sensitizing treatment.

References Cited in the file of this patent

UNITED STATES PATENTS

| | | |
|---|---|---|
| 1,042,827 | Schumacher | Oct. 29, 1912 |
| 1,994,483 | Ott | Mar. 19, 1935 |
| 1,997,745 | Renker | Apr. 16, 1935 |
| 2,200,363 | Kreis | May 14, 1940 |
| 2,214,950 | Aller | Sept. 17, 1940 |
| 2,239,452 | Williams | Apr. 22, 1941 |
| 2,258,956 | Misuraca | Oct. 14, 1941 |
| 2,279,567 | Holman | Apr. 14, 1942 |
| 2,311,889 | Toland et al. | Feb. 23, 1943 |
| 2,312,499 | Lierg | Mar. 2, 1943 |
| 2,357,913 | Sigford | Sept. 12, 1944 |
| 2,405,513 | Mullen | Aug. 6, 1946 |
| 2,447,836 | Beeber | Aug. 24, 1948 |
| 2,494,053 | Mitson | Jan. 10, 1950 |
| 2,506,164 | Moise | May 2, 1950 |
| 2,584,317 | Aller | Feb. 5, 1952 |